United States Patent [19]

Kooymans et al.

[11] 4,405,763

[45] Sep. 20, 1983

[54] THERMOSETTING RESINOUS BINDER COMPOSITIONS, THEIR PREPARATION, AND USE AS COATING MATERIALS

[75] Inventors: Petrus G. Kooymans; Johannes J. M. H. Wintraecken; Werner T. Raudenbusch; Josepha M. E. Seelen-Kruijssen; Gerardus C. M. Schreurs, all of Amsterdam, Netherlands

[73] Assignee: Shell Oil Company, Houston, Tex.

[21] Appl. No.: 349,219

[22] Filed: Feb. 16, 1982

Related U.S. Application Data

[62] Division of Ser. No. 99,363, Dec. 3, 1979, Pat. No. 4,332,711.

[51] Int. Cl.$^3$ .............................................. C08L 63/00
[52] U.S. Cl. ................................. 525/438; 525/533; 528/92; 528/112; 528/115; 528/176; 528/180; 528/194
[58] Field of Search ................ 525/533, 438; 523/402; 528/194, 92, 112, 115, 176, 180

[56] References Cited

U.S. PATENT DOCUMENTS

| 1,145,370 | 3/1915 | Sreeves | 260/835 |
| 3,682,814 | 8/1972 | Gilchrist | 204/181 |
| 4,104,147 | 8/1978 | Marchetti et al. | 204/181 C |
| 4,115,226 | 9/1978 | Zwack et al. | 204/181 C |
| 4,332,711 | 6/1982 | Kooymans et al. | 525/170 |

FOREIGN PATENT DOCUMENTS 1418372 12/1975 United Kingdom .
1461823 1/1977 United Kingdom .

Primary Examiner—J. Ziegler
Attorney, Agent, or Firm—Norris E. Faringer

[57] ABSTRACT

A thermosetting binder composition for coating, comprising:
(I) (1) A non-acidic resinous saturated compound having a molecular weight of at least 900, and an alcoholic hydroxyl content of at least 0.2 eq./100 g;
(2) A non-acidic polyester of a polycarboxylic acid cross-linking agent having more than one β-hydroxyl ester group per molecule, and at least one of components (1) and (2) having an alcoholic hydroxyl functionality of more than 2, and
(II) A transesterification-promoting metal salt or complex curing catalyst which is soluble in liquid hydrocarbons.

For aqueous compositions, component (I) (1) is preferably a neutralized epoxy resin/amine adduct and component (II) should be insoluble in water; they can be used for cathodic electrodeposition.

7 Claims, No Drawings

THERMOSETTING RESINOUS BINDER COMPOSITIONS, THEIR PREPARATION, AND USE AS COATING MATERIALS

This is a division, of application Ser. No. 099,363, filed Dec. 3, 1979 now U.S. Pat. No. 4,332,711.

BACKGROUND OF THE INVENTION

Thermosetting hydroxyl-containing resinous coating materials usually contain a cross-linking component, such as a phenolic resin, an aminoplast resin or a polyisocyanate; for epoxy resins also polyamines, polycarboxylic acids and anhydrides thereof have found widespread use; curing catalysts are often added to reduce curing time and/or temperature. Curing times of up to ½ hour and curing temperatures of up to 200° C. are for many purposes acceptable in the thermosetting coating field. The cross-linking component reacts during stoving with hydroxyl and/or epoxy groups of the main resinous binder component, and the cross-linking provides a coating which is insoluble and infusible, and therefore resistant to solvents and elevated temperatures.

Another type of coating materials contain an air-drying binder, which can cross-link through carbon-carbon double bonds, in contact with oxygen. Suitable drying accelerators include the metal salts, such as Co- and Mn naphthenate.

SUMMARY OF THE INVENTION

The invention relates to a novel type of thermosetting resinous binder compositions. The novel aspect is that these binders can be cured through a transesterification mechanism, have a binder structure that responds within acceptable times at acceptable temperatures to transesterification, and contain curing catalysts that are suitable for this purpose. The invention further relates to methods for preparing the resinous binders and to the use of the compositions for application in coatings, for example, as a solvent-based varnish or paint, a coating powder, an aqueous dispersion, or as a water-borne paint, in particular, for cathodic electrodeposition.

DESCRIPTION OF THE PREFERRED EMBODIMENTS

The invention may be defined as a thermosetting binder composition, heat-curable to give an insoluble infusible coating, comprising;
(I) a mixture or precondensate of
(1) a non-acidic resinous compound essentially free of ethylenical unsaturation, having a molecular weight of at least 900 and a hydroxyl content of at least 0.2 equivalents per 100 g, and
(2) a non-acidic polyester of a polycarboxylic acid cross-linking agent, having more than one β-hydroxyl ester group per molecule, at least one of components (1) and (2) having a hydroxyl functionality of more than 2; and
(II) a transesterification-promoting metal salt or metal complex curing catalyst which is soluble in liquid hydrocarbons.

In this context some general expressions are defined and explained as follows:

Non-acidic means that the material has an acid value of not more than 0.18 meq/g (acid number not more than 10). This will allow a residual acid content which in some cases is inevitable in praxis due to the method of preparation. Preferably the acid content is not more than 0.09 meq/g, and for systems intended for cathodic electrodeposition the acid content is preferably not more than 0.02 meq/g; all values are based on solid material.

Hydroxyl means aliphatic or cycloaliphatic hydroxyl, not phenolic hydroxyl.

Beta-hydroxyl ester in the definition of component (I) (2) means that the carbon atom adjacent to the esterified hydroxyl has a free hydroxyl group; in other words the ester function is derived from 1,2-glycol of which only one of the hydroxyl functions has been esterified. The glycol part may have substituents, such as alkyl-, ether- or stable ester groups. Stable in this connection means that the ester group is difficult to hydrolyze, as is the case with esters of branched monocarboxylic acids as hereinafter defined. This type of stable ester bonds will not give rise to transesterification reactions under normal stoving conditions.

Branched monocarboxylic acids as herein referred to are saturated aliphatic monocarboxylic acids wherein the carboxyl group is attached to a tertiary or quaternary carbon atom and which contain 9 to 11 carbon atoms per molecule.

Component (I) (1) has a hydroxyl content of preferably not more than 0.8 equivalents per 100 g. Component (I) (1) should be a soluble, fusible compound. Component (I) (1) may be chosen from several classes of hydroxyl-containing resinous materials, such as alkyd resins, epoxy resins, including the linear polymeric type derivatives of bisphenol A and epichlorohydrin, esters of epoxy resins, amine adducts of epoxy resins, and polymers prepared by polymerization or copolymerization of ethylenically unsaturated monomers.

A preferred type of alkyd resin is an alkyd resin prepared from a polycarboxylic acid or anhydride thereof, a polyhydric alcohol, and glycidyl esters of branched monocarboxylic acids.

Another preferred component (I) (1) is an epoxy resin or derivative thereof. Preferred epoxy resins are glycidyl ethers of 2,2-bis(4-hydroxyphenyl)propane having the general formula:

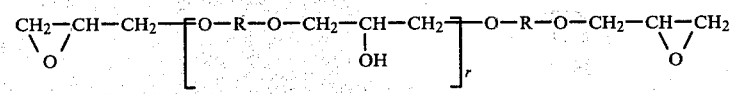

wherein R is the group:

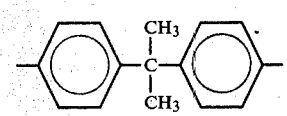

and r is a number which for epoxy resins of different molecular weight can differ. For making soluble derivatives preference is given to liquid or semi-liquid epoxy resins (wherein r has a value of from 0 to 1) or to the lower solid epoxy resins wherein r has a value of up to 4; epoxy resins which are suitable without modification have a molecular weight of more than 1400, and r has a value of more than 4. In the solid resins of the latter type a great part of the terminal glycidyl groups is usually present in hydrolyzed form as glyceryl groups, due to the methods of preparation.

Suitable epoxy resins of this type have molecular weights from 2000 to 4000, epoxy equivalent weights of the same order, and have from 0.35 to 0.40 hydroxyl equivalents per 100 g; the epoxy content is too low to effect sufficient cross-linking without a cross-linking agent.

Another suitable polyether of the latter type is a high-molecular weight linear polyhydroxyl ether, having a molecular weight of more than 20,000 and containing 0.35 hydroxyl equivalents per 100 g. Molecular weights herein are average molecular weights ($\overline{M}n$) as usual in polymeric compounds.

Suitable derivatives of epoxy resins are hydroxyl-containing esters, such as esters obtained by esterification of one or both epoxy groups of the lower epoxy resins (wherein r in the above formula has a value of from 0 to 4) with a monocarboxylic acid, preferably a hydroxyalkane monocarboxylic acid, such as glycolic acid, lactic acid or preferably dimethylol propionic acid. Such esterifications are preferably carried out at temperatures below 150° C. to avoid esterification of hydroxyl groups, in the presence of catalysts known to accelerate epoxy-carboxyl addition reactions, such as tertiary amines, quaternary ammonium salts, quaternary phosphonium salts or stannous octoate.

Other suitable epoxy resin derivatives are soluble adducts with primary or secondary amines, in particular amines having one or more hydroxyalkyl groups, such as diethanolamine. The epoxy resin here is preferably one of the above formula, wherein r is from 3 to 4.

Other suitable epoxy resin/amine adducts, in particular suitable for cathodic electrodeposition, will be described hereinafter.

Further suitable compounds to act as component (I) (1) are polymeric reaction products of caprolacton with polyhydric alcohols, and resinous polyols prepared by copolymerization of styrene with allyl alcohol.

Still further suitable compounds to act as component (I) (1) are copolymers of hydroxylalkyl acrylates and methacrylates with other copolymerizable ethylenically unsaturated compounds, such as styrene, methyl methacrylate, butyl acrylate, and vinyl esters, in particular vinyl esters of branched monocarboxylic acids. Copolymers containing the residues of the latter component can be made according to the process described in British Pat. No. 1,418,372.

The compounds outlined above are in particular suitable for thermosetting compositions to be applied as solutions in organic solvents. Compounds which are solid at room temperature and have softening points above 70° C. can also be used in thermosetting powder compositions.

For water-borne paints, in particular suitable for cathodic electrodeposition, a further group of compounds has been found very useful as component (I) (1).

Cathodic electrodeposition for applying resinous coatings to metals, in particular to iron and steel, from aqueous solutions or dispersions is known in the art. For a brief description with a literature survey reference is made to U.S. Pat. No. 4,115,226. In general, the starting material used is a well-known binder component, such as a diglycidyl ether of a dihydric phenol in which by reaction with a secondary amine tertiary amino functions are introduced, which by neutralization (complete or partial) effect solubility in water, and transport to the cathode (upon application of direct current voltage) of the binder component.

For curing (after baking) of this coating a cross-linking agent must be incorporated in the paint bath, which cross-linking agent is also sufficiently deposited on the cathode upon a voltage being applied and is capable of effecting a reasonable cure (which often requires certain catalysts).

According to U.S. Pat. No. 4,115,226 (see column 6) a mono-urethane of a di-isocyanate is attached as cross-linking component to hydroxy groups of the diglycidyl ether basis, after which amino functions are introduced by reactions of the epoxy groups with secondary amines (diethyl-amine, diketimine H-1, etc.). This binder, which contains as latent cross-linking component as attached blocked isocyanate function, is diluted with water (causing the ketimine functions to hydrolyze with formation of primary amino functions) and neutralized with lactic acid.

According to said U.S. Pat. No. 4,114,226 the corrosion resistance of the cathodically applied coatings is improved by incorporating in the electrodeposition bath certain amounts of a water-soluble lead salt, such as lead acetate. From Table II (columns 7 and 8) it is clear, however, that as the amounts of water-soluble lead salt increase, the film thickness decreases steeply to below the level that is considered acceptable for overall protection by a resinous baked coating. For neutralizing an amino resin in a cathodic electrodeposition bath according to U.S. Pat. No. 3,682,814 an acid is recommended that decomposes at the anode; in order to promote this decomposition it is recommended to incorporate in the bath small amounts of a decomposition-promoting metal salt.

It has now been found that highly favorable results in the application of coatings to metals can be obtained by means of an aqueous electrodeposition bath incorporating a resinous binder composition which after neutralization with an acid can be diluted with water, the binder composition being based on soluble amine adducts of diglycidyl ethers of dihydric phenols, characterized in that the binder comprises as component (I) (1) a compound having the formula:

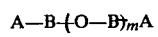

wherein m is a number from 0 to 2, A a group which is linked to B through a tertiary amino function, B a group

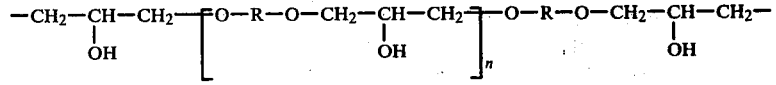

wherein n is a number from 0 to 4 and R the hydrocarbon radical of a dihydric phenol, C a group which is linked to B through two tertiary amino functions.

This type will further be referred to as a "linear" amine adduct.

Another very useful compound as component (I) (1) is a compound having the formula:

$$[A-B+C-B)_{\overline{m}]_{p}}D$$

wherein A, B, C and m have the same meaning as above, p is a number from 3 to 4, and D is a group linked to B through p tertiary amino functions. This type will further be referred to as a "branched" amine adduct.

Component B is derived from a diglycidyl ether having the formula:

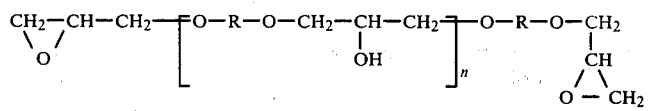

wherein n is a number from 0 to 4, preferably from 1 to 3, in particular 1.8 to 2.2, and R the hydrocarbon radical of a dihydric phenol, preferably the group:

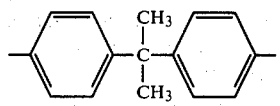

The latter dihydric phenol is 2,2-bis(4-hydroxyphenyl)-propane, and diglycidyl ethers thereof are known commercial products ("EPON" 828, 1001 and 1004 diglycidyl ethers, wherein n in the above formula has a value of about 0, 2 or 4, respectively). Component A is derived from an amine that has a single secondary amino function but may further have a variety of functional groups, provided they do not react with glycidyl ether groups under the reaction conditions used. Examples of such "latent" groups include hydroxyl groups, ketimine groups and ester groups. Examples of suitable amines of this type are diethanolamine, di-isopropanolamine and the diketimine of diethylenetriamine with methyl isobutyl ketone. Component C is derived from an amino compound having per molecule two N-H functions that are reactive with epoxy groups. These functions may be embodied in a single primary monoamino function or it two secondary amino functions. Further this amine may have other functions as well which react hardly if at all with epoxy groups, such as hydroxyl or tertiary amino. Examples are 3-(N,N-dimethylamino)propylamine, the reaction product of one mole of 1,6-diaminohexane with 2 moles of glycidyl ester of branched monocarboxylic acids, and amino-containing amides. For the preparation of the linear amine adducts the diglycidyl ethers are preferably reacted with amines as described above in the ratio of one amino-hydrogen atom per epoxy group, in which reaction the amount of amine having a single secondary amino group may vary from 33 to 100% of the available epoxy groups. If water-sensitive components, such as amines substituted with ketimine groups are used, the reactions thereof with the glycidyl compound should be carried out under anhydrous conditions. Reaction of the amines with the diglycidyl ethers can be effected in one or more steps; thus, the secondary amine may first be allowed to react with the diglycidyl ether and then the amine with the two reactive N-H functions added. Solvents such as glycol ethers or ketones can be used. The reaction temperature may be 70°-140° C. and is preferably 70°-120° C. It will be clear that the value for m is an average value and that this type of component (I) (1) indicates a general structure of a mixture of reaction products.

The "branched" amine adducts can be prepared by reacting first a part (say 25 to 40 percent) of the epoxy groups of a diglycidyl ether with a secondary monoamine, such as diethanolamine or dipropanolamine at moderate temperature, and reacting then with the polyfunctional amines.

As amine having p N-H functions per molecule provides in the final adduct the structural component D; the N-H functions may be embodied in primary or in secondary amino groups, and further this amine may have other functions that react hardly if at all with epoxy groups, such as hydroxyl, tertiaryamino, or ester groups. When use of a commercial amine having a N-H functionality of more than 4 is contemplated, for example because of its price, the functionality can be reduced by reacting that amine first with a sufficient amount of a monoepoxide, for example glycidyl esters of branched monocarboxylic acids. A very suitable amine having 3 N-H functions is a reaction product of diethylene triamine (1 mol.) and glycidyl esters of branched monocarboxylic acids (2 mol.). This reaction is preferably conducted at moderate temperatures, for example by starting with 80° C., and raising the temperature to 110° C. until the epoxy content is zero.

Another very suitable amine having 3 N-H functions is obtained by reacting 1,6-hexanediamine (1 mol.) and glycidyl esters of branched monocarboxylic acids (1 mol.) under similar conditions.

An example of an amine having 4 N-H functions is the reaction product of triethylene tetramine (1 mol.) and glycidyl esters of branched monocarboxylic acids (2 mol.). Apart from a reduction in N-H functionality, the reaction of polyamine and glycidyl ester may also serve to reduce the general reactivity.

The preferred value of p is 3. It will be clear that values of m and p in the formula for the branched adduct are average values and that its formula indicates a general structure of a mixture of reaction products. In general, to prevent gelation or a viscosity which is too high, the amount of secondary amine reacted first with the diglycidyl ether is p mol. per mol. of the p-functional amine, or slightly more to be safe. Solvents such as glycol ethers or ketones may be used, and the reaction temperature is kept moderate, for example in the range of from 70° to 140° C., more preferably in the range of from 70° to 120° C.

In the general scope of the invention component (I) (2), the cross-linking component, has more than one β-hydroxyester group per molecule. The β-hydroxyl group is needed for sufficient cross-linking at acceptable temperatures within acceptable times, for example at temperatures up to 200° C., and curing times of up to 30 minutes. By the process of curing or stoving the coating, β-hydroxyl ester groups of the polyester transesterify to the effect that ester bonds are formed between carboxyl groups of the polyester and hydroxyl groups of component (I) (1), with release of a glycol-type compound; the latter may then evaporate.

The result is a cross-linked coating which is solvent-resistant and infusible. When, on the contrary, a polyester is used which does not contain β-hydroxyl ester groups, but say simple alkyl ester groups, such as methyl, ethyl or butyl, the transesterification is too sluggish to effect sufficient cross-linking at acceptable conditions, and the stoved coating will not have acceptable solvent resistance: it can, for example, be easily rubbed away with a piece of cotton cloth soaked in methyl ethyl ketone (MEK).

Compounds in general suitable as component (I) (2) are poly(2-hydroxyalkyl)esters of polycarboxylic acids. Examples are: bis(2-hydroxyalkyl)esters of dicarboxylic acids, such as bis(2-hydroxybutyl)azelate and bis(2-hydroxyethyl)terephthalate; poly(2-hydroxyalkyl)esters of acidic half-esters prepared from a dicarboxylic acid anhydride and a polyhydric alcohol. The latter type is very suitable if a final functionality of more than 2 is desired; an example is a polyester prepared by reacting first equivalent amounts of the dicarboxylic acid anhydride (succinic anhydride, phthalic anhydride) with a trihydric or tetrahydric alcohol (glycerol, trimethylolpropane, pentaerythritol), at temperatures below 150° C., and reacting then the acidic polyester with at least the equivalent amount of an epoxy alkane, such as 1,2-epoxy butane, ethylene oxide, or propylene oxide. Another suitable polyester is a lower 2-hydroxyalkyl-terminated poly-alkylene glycol terephthalate. A further suitable polyester (tetra-functional) is prepared from the half-ester intermediate from trimellitic anhydride and propylene glycol (molar ratio 2:1), by reacting the intermediate with 1,2-epoxy butane and the glycidyl ester of branched monocarboxylic acids.

In particular for aqueous systems, for example for cathodic electrodeposition, suitable components (I) (2) are non-acidic polyesters prepared from a polycarboxylic acid anhydride, one or more glycols, glycol monoethers, polyols, and/or monoepoxides. Suitable polycarboxylic anhydrides are dicarboxylic acid anhydrides, such as succinic anhydride, phthalic anhydride, tetrahydrophthalic anhydride, hexahydrophthalic anhydride, methylhexahydrophthalic anhydride; eminently suitable is trimellitic anhydride, also in connection with the hydrolytic stability of the products prepared with it.

By glycols and mono-epoxides are understood compounds containing per molecule not more than two alcohol functions which can be reacted with carboxylic acid or anhydride functions below 150° C.

Very suitable mono-epoxides are glycidyl esters of branched monocarboxylic acids. Further, use can also be made of alkylene oxides, such as ethylene oxide or propylene oxide. Suitable glycols are for example ethylene glycol and polyethylene glycols, propylene glycol and polypropylene glycols, and 1,6-hexane diol. Non-acidic polyesters can be prepared, for example, by reacting, in one or more steps, trimellitic anhydride (TMA) with glycidyl esters of branched monocarboxylic acids in a molecular ratio of 1:1.5 to 1:3, if desired with the aid of an esterification catalyst such as stannous octoate or benzyl dimethyl amine, at temperatures of 50°–150° C.

Alternatively, trimellitic anhydride (1 mol.) can be reacted first with a glycol or a glycol monoalkyl ether, such as ethylene glycol monobutyl ether in a molecular ratio of 1:0.5 to 1:1, after which the product is allowed to react with 2 moles of glycidyl esters of branched monocarboxylic acids. Furthermore, the polycarboxylic acid anhydride (containing two or three carboxyl functions per molecule) or a mixture of polycarboxylic acid anhydrides can be reacted simultaneously with a glycol, such as 1,6-hexane diol and/or glycol-ether and mono-epoxide, after which the product can be reacted with a further amount of mono-epoxides, if desired. For aqueous compositions these non-acid polyesters can also be modified with polyamines such as diethylene triamine to form amide polyesters. Such "amine-modified" polyesters may be incorporated in the linear or branched amine adducts described above to form self-curing amine adduct esters.

The non-acidic polyesters of the types described above are soluble in conventional organic solvents, and can be mixed readily with components (I) (1).

Polyesters described as suitable for aqueous systems disperse readily in water in the presence of neutralized amine adducts.

Component (II) in general is a transesterification-promoting metal salt or complex that is soluble in liquid hydrocarbons, such as white spirit or xylene. A commercially available concentrated solution in such a solvent can then easily be diluted. Suitable salts meeting that requirement are in general 2-ethyl hexoates (octoates) and naphthenates.

For solvent-based coating systems or for coating powders in general no further requirements are set. For use in aqueous systems, in particular for cathodic electrodeposition, the metal salt or complex should at the same time be insoluble or substantially insoluble in water, in order to avoid adverse effects of a high ion concentration, and of course should not be inactivated by water.

Very suitable in view of their generally high activity are for example salts (octoates or naphthenates) of lead, zinc, calcium, barium and iron$^{III}$. A suitable example of a metal complex is titanium acetyl acetonate. Other suitable salts, although in general less active than those mentioned above, are salts of tin$^{II}$, manganese, cobalt and dibutyltin dilaurate. Further can be mentioned in general salts (octoates, naphthenates) of the alkali and earth alkali metals, of the lanthanides, and of zirconium, cadmium, chromium; acetyl acetonate complexes of lead, zinc, cadmium, cerium, thorium, copper; alkali aluminium alcoholates and titanium tetraisopropoxide.

Mixtures of salts and/or complexes can also be used. Some of the salts or complexes mentioned above are known as esterification and transesterification catalysts for the preparation of alkyd resins, epoxy resin esters, and linear polyesters for fibres, in general for the preparation of fusible polyesters which are soluble in organic solvents. However, the temperatures used there are generally far above 200° C., the reaction times at least some hours, and the amount of catalyst is usually very low, below 0.1% by weight of the polyester. None of these uses indicated that these salts could be used as cross-linking accelerators in coatings, i.e. for the formation of insoluble, infusible polyester-like coatings, as in the present binder compositions.

In the present compositions the accelerating salts or complexes can be used in amounts of 0.1–5, preferably 1–3 percent by weight of component (I). In view of the varying metal content of available metal salts or complexes or solutions thereof the amount of catalyst is more conveniently indicated by the metal content in the compositions; metal contents of 0.3 to 1.0 percent by weight are suitable in general, and metal contents of 0.5–0.8 percent by weight are preferred.

The weight ratio of the components (I) (1) and (I) (2) can vary between wide limits, in dependence of the reactivity of the components, the desired cure schedule, and the desired properties of the cured coating; the optimum ratio for a chosen mixture can be determined experimentally as usual; as a general guide line that weight ratio can be chosen from 90:10 to 50:50, and more particularly from 80:20 to 60:40.

In general, the components (I) (1), (I) (2) and II can be mixed simultaneously or in any order that would be more convenient. In some cases as outlined above it is more convenient to make first a precondensate of components (I) (1) and (I) (2), and to mix that precondensate with component (II). In the case of poly(2-hydroxyalkyl)polyacrylates or methacrylates components (I) (1) and (I) (2) may be identical, in which case the 2-hydroxyalkyl group has a dual function: during the stoving, part of the free hydroxyl groups reacts as acceptor for a carboxyl group to form an ester bond, and a corresponding part of 2-hydroxyalkyl groups is eliminated thereby as a glycol.

The components and/or the composition may be diluted with suitable volatile organic solvents, for example to regulate the viscosity or the solids content of the final paint or lacquer. Conventional paint additives may be incorporated, such as pigments, fillers, dispersants, stabilizers and the like.

The lacquers or paints based on organic solvents can be applied by conventional methods, such as by brush, roller, by spraying, dipping, and the like onto a variety of materials, preferably metals, such as bare steel, phosphated steel, zinc, tin plate (as a can lacquer), as the case may be as the sole coating layer or as a primer or topcoat.

The compositions may also be dispersed in water, and used as a thermosetting aqueous dispersion paint.

The coatings can then be stoved, for example at temperatures ranging from 150° to 200° C., preferably not above 180° C., during times varying from 10 to 30 minutes; the exact cure schedule will, of course, depend on reactivity and amount of components.

Compositions wherein component (I) (1) is a linear or branched amine adduct as hereinbefore described may be used for the preparation of water-soluble or water-dispersible coating compositions by neutralizing preferably from 20 to 100% of the amino functions with an acid, preferably with an organic carboxylic acid, such as formic acid, acetic acid, citric acid or preferably lactic acid. For the dissolution or dispersal in water no particularly low pH is required (as is often the case in known systems): a pH of 5.5 to 7.0 is usually sufficient. The new binder compositions give a good cure at 180° C. and the baked coatings have good mechanical and chemical resistance.

Binder compositions neutralized as described above may be used in 2-20% by weight aqueous solutions or dispersions in cathodic electrodeposition baths, in which the compositions may first be diluted with a water-soluble organic solvent such as a glycol ether, for example to simplify the neutralization or the dilution with water. The aqueous electrodeposition baths may also contain conventional additives, such as pigments, fillers, dispersants, stabilizers and the like. The deposition baths can be used for applying coatings to steel that has or has not been phosphated.

The invention is illustrated by examples. In the examples parts and percentages are by weight, unless otherwise stated or apparent from the context. Analytical data (amino, epoxy, hydroxyl) are based on solid matter.

Polyethers D, E and G are commercial solid glycidyl polyethers of 2,2-bis(4-hydroxyphenyl)propane having an epoxy molar mass of 472, 893, and 3500, respectively, a hydroxyl content of 0.29, 0.33 and 0.40 equivalents per 100 g, respectively, and molecular weights ($\overline{Mn}$) of about 900, about 1400 and about 3750, respectively.

Polyether OL is a polymeric glycidyl or glyceryl ether of 2,2-(4-hydroxyphenyl)propane having a hydroxyl content of 0.35 equivalents per 100 g, and a molecular weight ($\overline{Mn}$) of more than 30,000.

Glycidyl ester C10E is a commercial glycidyl ester of saturated aliphatic monocarboxylic acids, wherein the carboxyl group is attached to a tertiary or quaternary carbon atom and which monocarboxylic acids have on average 10 carbon atoms per molecule; the glycidyl ester has an epoxy molar mass of 250.

TMA is trimellitic anhydride.

GPC is gel permeation chromatography.

"MEK rubs" is the number of rubs to be given to the cured coating with a cloth wetted with methyl ethyl ketone.

Impact strength (IS) is the reverse impact strength, determined by the British Standard Falling Ball Test, but recorded in cm.kg. 50 or more MEK rubs and impact strength >90 cm.kg are an indication for good cure.

The Salt Spray Resistance (SSR) was determined according to ASTM-B 117-64 and recorded as mm loss of adhesion from scratch after 10 days salt spray.

Metal salt catalysts were octoates (2-ethyl hexoates), some in solution in hydrocarbon solvent, as commercially available. The metal content of these octoates was:

| | | |
|---|---|---|
| $Pb^{II}$ octoate | Pb | 33% w |
| Zn octoate | Zn | 10% w |
| $Fe^{III}$ octoate | Fe | 6% w |
| Ba octoate | Ba | 5% w |

In the tables only the amount of metal in the compositions is recorded, unless otherwise indicated.

The lactic acid used was a 90%w product in water.

Examples I to IX describe preparation of linear epoxy resin/amine adducts and use in water-borne paint for cathodic electrodeposition. Example X describes preparation of a branched epoxy resin/amine adduct and its use in a water-borne paint for cathodic electrodeposition. Examples XI and XII describe hydroxyl-containing resins and β-hydroxyl ester polyesters, respectively. Examples XIII and following describe use of such resins and polyesters in thermosetting coatings.

EXAMPLE I

Preparation of linear amine adducts.

(a) To a solution of polyether D (377.6; 0.8 epoxy equivalent) in ethylene glycol monobutyl ether (189 g) are added diethanol amine (42.0 g, 0.4 mol.) and 3-(N,N-dimethyl amino)propyl amine (20.4 g, 0.2 mol.). The mixture is kept at 70°–80° C. until the epoxy content is zero. The product was a clear solution, 70% solids, N content 1.82 meq./g, OH content 0.64 eq./100 g.

(b) To a solution of polyether D (283.2 g; 0.6 epoxy equivalent) in ethylene glycol monobutyl ether (161 g) were added diethanol amine (21.0 g; 0.2 mol.), 3-(N,N-dimethyl amino)propyl amine (10.2 g; 0.1 mol.) and an adduct of 1,6-diamino hexane and glycidyl ester C10E (61.6 g; 0.1 mol. of adduct). This adduct had been prepared by reacting 1,6-diamino hexane (116 g; 1 mol.) with glycidyl ester C10E (500 g; 2 mol.) at 80° C. for 3 hours. The mixture of the polyether and the amines was reacted by heating first at 85°–90° C. for 4 hours with stirring, and then at 120° C. for 1 hour. The epoxy content was then zero. N content: 1.60 meq./g, OH content 0.56 eq./100 g.

EXAMPLE II

Non-acidic polyesters.

(a) Trimellitic anhydride (192 g; 1 mol.) was dissolved in ethylene glycol monobutyl ether (486 g) at 100° C. Subsequently, glycidyl ester C10E (550 g; 2.2 mol.) and benzyl dimethyl amine (1.8 g; esterification catalyst) were added. The mixture was kept at 120° C. until the acid content was <0.02 meq./g. The clear solution had a solids content of 70%.

(b) A mixture of trimellitic anhydride (192 g; 1 mol.) and glycidyl ester C10E (260 g; 1.04 mol.) was heated to 90° C. An exothermal reaction sets in and the mixture is cooled for a short time to prevent the temperature from rising above 120° C. After that, heating at 120° C. is continued for a further half hour, benzyl dimethyl amine (2.2 g) is added and the temperature is raised to 140° C. A further amount of glycidyl ester C10E (260 g; 1.04 mol.) is added and the viscous mass is kept at 140° C. for a further 2 hours. Acid content 0.013 meq./g, molecular weight approximately 3000 (determined by means of GPC). The product was diluted with diethylene glycol diethyl ether (178 g). Solids 80%.

(c) Part of the product prepared according to Example II (b) (178 g, equivalent to 0.2 TMA(C10E)$_2$ units) was kept at 140° C. for 4 hours with diethylene triamine (10.3 g; 0.1 mol.). A diamide monoamine polyester is formed with 0.83 amino meq./g. Solids: 81.1%.

(d) Trimellitic acid (210 g; 1.0 mol.) was mixed with tetrahydrofuran (164.5 g). Propylene oxide (348 g; 6 mol.) and benzyl dimethyl amine (1.9 g) were added and the mixture was kept in a closed vessel at 40° C. for one week, with stirring. The acid value was then zero. Solvent and excess propylene oxide were evaporated in vacuo. The product is tri(2-hydroxypropyl)ester of trimellitic acid.

(e) Succinic anhydride (100 g; 1 mol.) and glycidyl ester C10E (270 g; 1.08 mol.) were heated to 120° C. with benzyl dimethyl amine (0.8 g). An exothermal reaction sets in; the temperature was subsequently maintained at 140° C. until the acid value was zero.

(f) A slight modification of (b). Trimellitic anhydride (192 g; 1 mol.) and glycidyl ester C10E (500 g; 2 mol.) were mixed and heated with stirring to 100° C. An exothermic reaction sets in, and the temperature was allowed to rise to 190° C. The mixture was cooled to 140° C., benzyl dimethylamine (2 g) was added as catalyst, and heating at 140° C. was continued for 3 hours. The viscous clear product had an acid content of 0.053 meq./g and a molecular weight (GPC) of about 3000.

EXAMPLE III

Preparation of binder compositions and evaluation as electrodeposition paints.

General procedure 50 g of epoxy resin/amine adducts as indicated in Table I, column EA, were mixed with the amounts of cross-linking agent indicated in column BB; sufficient ethylene glycol monobutyl ether was added to bring the solids content to 70%. Catalysts and other components (if any) were then added as well as lactic acid for neutralization of from 20 to 100% of the amino groups. Demineralized water was added slowly to bring the solids content to 10%. The pH was determined, and coatings were applied by cathodic electrodeposition (DC 100–200 volts) to degreased steel panels which were then baked at 180° C. for half an hour.

The data and results are listed in Table I.

TABLE I

| | Binder composition | | | | | Solvent | Lactic | | Baked ED coatings | | | Properties |
|---|---|---|---|---|---|---|---|---|---|---|---|---|
| | EA of | Polyester (BB) | | Catalyst | | (EGBE)** | acid, | | Thickness | MEK | IS | SSR |
| No. | Example | Example | g | Type | g* | g | g | pH | (μm) | rubs | cm.kg | mm |
| 1 | I (a) | II (b) | 20.6 | — | | 2.9 | 3.2 | 6.6 | 18–20 | >50 | >90 | 5–7 |
| 2 | I (a) | II (b) | 20.6 | Pb | 0.9 | 2.9 | 3.2 | 6.5 | 19–22 | >50 | >90 | <1 |
| 3 | I (a) | II (c) | 43.0 | — | | 6.8 | 3.2 | 6.1 | 18–22 | >50 | >90 | 25–30 |
| 4 | I (a) | II (c) | 43.0 | Pb | 1.3 | 6.8 | 3.2 | 6.1 | 19–20 | >50 | >90 | 5–7 |
| 5 | I (b) | II (b) | 15.9 | — | | 2.3 | 2.8 | 6.0 | 17–19 | 20–30 | <5 | 5 |
| 6 | I (b) | II (b) | 15.9 | Pb | 0.9 | 2.3 | 2.8 | 5.9 | 15–18 | >50 | >90 | 1–2 |
| 7 | I (b) | II (b) | 15.9 | Zn | 0.9 | 2.3 | 2.8 | 6.1 | 18–20 | >50 | >90 | 2–4 |
| 8 | I (b) | II (a) | 22.5 | Pb | 1.0 | — | 2.8 | 6.1 | 15–18 | >50 | >90 | 5–7 |
| 9 | I (b) | II (d) | 7.0 | Pb | 0.8 | 3.0 | 2.8 | 6.2 | 15–18 | 50 | >90 | 4–5 |
| 10 | I (b) | II (e) | 6.4 | Pb | 0.8 | 2.8 | 2.8 | 6.0 | 13–16 | 50 | >90 | 2–3 |

*In Table I the amounts of metal octoates are recorded as metal octoate solids.
**EGBE: ethylene glycol monobutyl ether.

EXAMPLE IV

Self-cross-linking or self-curing binder.

Polyether D (188.8 g; 0.4 epoxy equivalents) was dissolved in a mixture of ethylene glycol monobutyl ether (90 g) and methyl isobutyl ketone (36 g). Diethanol amine (10.5 g; 0.1 mol.) and amine-modified polyester according to Example II(c) (188.3 g) and diketimine prepared from 1 mol. of diethylene triamine and 2 mol. of methyl isobutyl ketone (26.7 g=0.1 mol. of diketimine) were added thereto. The mixture was heated at 100° C. for 3 hours; the nitrogen content was then 1.41 meq./g, the remaining epoxy content 0.03 meq./g and the OH content not originating from the amine-modified polyester 0.24 eq./100 g. Solids: 70%w.

This product (100 g) was mixed and lead[(II)] 2-ethyl hexoate (1.4 g; Pb content 33%; Pb content of mixture 0.67%w on solids) and lactic acid (3 g). By slow addition of demineralized water (597 g) a milky-blue dispersion was obtained having a pH of 6.1 and a solids content of 10%. Smooth coatings (thickness 15–17 micrometers) were obtained by cathodic electrodeposition (DC 200 Volts) of degreased steel panels. After baking at 180° C. (30 minutes) the coatings had the following properties:
Number of MEK rubs: >50
Impact strength: >90 cm.kg
Salt spray resistance (10 days): <2 mm loss of adhesion from the scratch.

EXAMPLE V (a) Tetrafunctional polyester, preparation.

1,6-Hexane diol (118 g; 1 mol.) and glycidyl ester C10E (500 g; 2 mol.) were mixed and heated to 120° C. Trimellitic anhydride (384 g; 2.0 mol.) was added and the exothermal reaction was controlled by cooling (temperature 120°-130° C.). After half an hour a further amount of glycidyl ester C10E (575 g; 2.3 mol.) was added and the mixture kept at 120° C. for a further 5 hours. At room temperature the product was a solid, sticky substance; the remaining epoxy content was 0.0-meq./g and the acid value <0.02 meq./g.

(b) Binder composition, evaluation.

In accordance with the general directitons of Example III binder compositions were prepared from epoxy resin/amine adduct of Example I(b) and polyester of Example V(a) in a weight ratio of 2.5:1. By means of ethylene glycol monobutyl ether the solids content was brought to 70%. Per 100 g of solids, 0.6 g on metal of the following catalysts were added to samples of the solution: Zn octoate, $Fe^{III}$ octoate, $Pb^{II}$ octoate. After neutralization with lactic acid and dilution with demineralized water the 10% solutions all had a pH of 6.2-6.3. After cathodic electrodeposition on degreased steel panels as in Example IV the coating thickness was 15-20 micrometers; after baking (at 180° C. for 30 minutes) the properties were:
Number of MEK rubs: >50
Impact strength: >90 cm.kg
Salt spray resistance (10 days): 1.2 mm loss of adhesion from the scratch.

A sample to which no catalyst had been added stood only 20-30 MEK rubs, had an impact strength <5 cm.kg and in the salt spray test 5-7 mm loss of adhesion from the scratch. Using titanium acetyl acetonate (0.9 g) per 100 g of binder, the results were virtually identical to those obtained with the above metal salts.

EXAMPLE VI

Evidence of transesterification.

A binder composition as in Example V (b), containing $Pb^{II}$ naphthenate was electrodeposited cathodically onto aluminium panels, and the coated panels were dried in vacuum at 45° C. until constant weight (20 hours). 10 Panels (coating weight 5.88 g) were then stoved in a closed glass container at 180° C. during 30 minutes. Volatile material condensed on the glass walls after cooling was quantitatively recovered with hexane, and the hexane was evaporated: residue 1.30 g (22.1% of coating weight).

The IR-spectrum showed that the residue was the monoglyceride of the branched monocarboxylic acids (the monoglyceride for comparison was prepared from the branched acids and glycidol) of about 90% purity; there were no peaks at wave numbers 1610 and 1505 $cm^{-1}$, showing that aromatic compounds were absent. The nitrogen content of the volatiles was very low (0.1 meq./g), showing that only a negligible amount of N-compounds had volatilized.

EXAMPLE VII

Self-cross-linking binder.

The epoxy resin is reacted first with the cross-linker, followed by reaction with amines.

Polyether D (472 g; 1.0 epoxy equivalents), the polyester of Example II (b) (444 g, 355 g solids), benzyl dimethylamine (2 g) and methyl isobutyl ketone (118 g) were heated to 140° C. The initially cloudy blend became clear after ½ hour, and was cooled to room temperature after a reaction time of two hours. It had an epoxy content of 1.15 meq./g solids.

This product (108.7 g; 87 g solids) was thinned with ethylene glycol monobutyl ether (21.7 g) and blended with diethanolamine (7.9 g; 0.075 mol.) and the diketimine described in Example IV (6.7 g, 0.025 mol.).

The mixture was reacted for 5 hours at 70° C. when the epoxy content was nil and the amine content was 1.35 meq./g. The product had a solids content of 70%w.

Part of this product (71.4 g; 50 g solids) was blended with lactic acid (3.0 g) and lead octoate (1.0 g). Demineralized water (424.5 g) was added gradually to bring the solids content to 10%w. A hazy solution was obtained which had a pH of 7.0.

From this solution coatings were electrodeposited cathodically at 150 V onto degreased steel panels. After baking at 180° C. for 30 minutes glossy, hard films were obtained with the following properties:
Thickness: 15 micrometers
MEK rubs: >100
Impact strength: >90 cm.kg
Salt spray resistance: <5 mm underrust after 10 days.

EXAMPLE VIII

Pigmented electrodeposition paint.

The epoxy resin/amine adduct of Example I (b) (109 g; 76.3 g solids), the polyester of Example II (b) (35.5 g; 28.4 g solids), ethylene glycol monobutyl ether (5.1 g), lead octoate (2.1 g) and lactic acid (6.0 g) were blended. Demineralized water (473 g) was added gradually to form a binder solution of 16.6% solids.

To prepare a pigment dispersion, part of this binder solution (200 g) was ball-milled for one day with titanium dioxide pigment (33.5 g), carbon black (2.0 g) and clay ASP-100 (2.0 g). The resulting pigment dispersion was diluted with more of the above binder solution (400 g) and further thinned with dimineralized water (612.5 g). The resulting pigmented paint solution had the following characteristics:
Solids: 11%w
Pigment/binder weight ratio: 0.376
pH: 5.9
Specific resistance: 635 Ω.cm.

At 150-200 V coatings were electrodeposited cathodically from this paint, using solvent-degreased steel panels as the cathodes. On baking at 180° for 30 minutes hard, glossy coatings with the following properties were obtained:
Thickness: 15-18 μm
MEK rubs: >100
Impact strength: >90 cm.kg
Salt spray resistance (10 days): <2 mm underrust.

EXAMPLE IX

Pigmented electrodeposition paint.

The resin solution of Example I (b) (163.7 g; 114.6 g solids was blended with the cross-linking polyester of Example II (f) (42.6 g) which had been dissolved in ethylene glycol monobutyl ether (18.3 g). Pb octoate (3.1 g) and lactic acid (8.2 g) were added. To this blend demineralized water (393 g) was added slowly with stirring. The resulting milky solution had a solids content of 25%. Part of this solution (200 g), micromized red iron oxide (35.5 g) and clay ASP-100 (2.0 g) were dispersed in a sand mill for 90 minutes to obtain a Hegman fineness of 10–20. This pigment paste was thinned with more of the above-mentioned aqueous solution (400 g) and finally thinned with demineralized water (612.5 g) to a solids content of 15%w.

The resulting paint had a pH of 6.1 and a specific conductivity of 1750 μS/cm. This paint was cathodically electrodeposited onto solvent-degreased steel panels at a temperature of 29° C. and a voltage of 175 V (direct current). The coatings were rinsed with water and stoved at the conditions specified below. Very smooth, semi-glossy coatings with a thickness between 18 and 20 micrometers were obtained. The Table shows that down to stoving temperatures of 140° C. adequate cross-linking and excellent salt-spray resistance were observed.

| Stoving conditions °C./minutes | MEK rubs | Impact strength (cm.kg) | Salt spray resistance |
|---|---|---|---|
| 180/30 | >50 | >90 | <2 |
| 170/30 | >50 | >90 | <2 |
| 160/30 | >50 | 67–90 | <2 |
| 140/30 | ~50 | <11 | 2–3 |

EXAMPLE X

Preparation and evaluation of a branched epoxy resin/amine adduct as cathodic electrodeposition paint.

A solution of Polyether D (475 g; 1.0 epoxy-equivalents) in ethylene glycol monobutyl ether (252 g) was reacted with diethanolamine (31.5 g; 0.3 mol.) at 70° C. for one hour. Then, a mixture of 3-(N,N-dimethylamino)propyl amine (20.4 g; 0.2 mol) and an adduct of diethylene triamine with glycidyl ester C10E (60.3 g; 0.1 mol.) were added. The latter adduct had been prepared by reacting diethylene triamine (103 g; 1 mol.) with glycidyl ester C10E (500 g; 2 moles) at 80° C. for two hours. The reaction with the Polyether D was continued for one hour at 90° C. followed by one hour at 110° C. The epoxy content was then zero and the amino nitrogen content 1.70 meq./g solids. The solids content was 70%w. The product had a calculated hydroxyl content of 0.515 eq./100 g solids.

Part of the resin solution (100 g; 70 g solids) was blended with the cross-linking polyester of Example II (f) (16.7 g) which had been dissolved in ethylene glycol monobutyl ether (7.2 g). Lead octoate (1.7 g) and lactic acid (5.9 g) were added. This mixture was thinned with demineralized water (765.5 g) to a solids content of 10%w. The pH of the resulting milky dispersion was 6.4. The system was cathodically electrodeposited onto solvent degreased steel panels at voltages between 250 and 350 V. The resulting coatings were baked at 180° C. for 30 minutes.

The resulting coatings had a thickness of 15–17 micrometers and showed an adequate degree of cross-linking (>50 MEK rubs, impact strength >90 cm.kg) as well as excellent salt spray resistance (<2 mm loss of adhesion from scratch after 20 days in the salt spray resistance test).

EXAMPLE XI

Hydroxyl-containing resins.

(a) Adduct of Polyether E and dimethylol propionic acid.

Polyether E (893 g; 1 epoxy equivalent), dimethylol propionic acid (134 g; 1 mol) and benzyl dimethyl amine (2.5 g) were heated with stirring at 140° C. during 4 hours; the acid content was then 0.053 meq./g. The calculated hydroxyl content of the brittle solid product was 0.59 eq./100 g.

(b) Adduct of Polyether E and diethanolamine.

Polyether E (1786 g, 2 epoxy equivalents) was melted and reacted with diethanolamine (210 g, 2 moles) at 135° C. for 5 hours. The product, a brittle resin at room temperature, had a calculated hydroxyl content of about 0.6 eq./100 g and a residual epoxy content below 0.02 meq./g.

(c) Hydroxyl-containing alkyd resin DX-32.

This resin was prepared by reacting isophthalic acid (166 g; 1.0 mol.), trimethylol propane (80.4 g; 0.6 mol.) and glycidyl ester C10E (150 g; 0.6 epoxy equivalents) in the presence of xylene (5%w) at a temperature rising from 190° C. to 240° C. with azeotropic removal of the water formed. The mixture was kept at 240° C. until the acid content was 0.12 meq./g. The calculated hydroxyl content was 0.25–0.27 eq./100 g solids. The resin was diluted with methyl isobutyl ketone/xylene 1:1 to give a solution having solids content 69.4%w.

(d) Polycaprolactone triol PCP-0310.

A commercial material was used which had molecular weight 900, hydroxyl content 0.333 eq./100 g and acid content 0.005 meq./g.

(e) Resinous polyol RJ-100.

A commercial copolymer of styrene and allyl alcohol having a molecular weight about 1150 and hydroxyl content 0.45 eq./100 g.

(f) Alkyd resin D 800.

A commercial alkyd resin based on phthalic acid, adipic acid and an aliphatic triol; molecular weight around 1150, hydroxyl content 0.52 eq./100 g, and acid content below 0.07 meq./g.

(g) Polyether OL.

This resin was used as a commercial 40%w solution in methyl ethyl ketone.

EXAMPLE XII

Polyester cross-linking compounds.

(a) Bis-(2-hydroxybutyl)azelate.

Azelaic acid (37.6 g, 0.2 mol.), 1,2-epoxybutane (57.6 g, 0.8 mol.) and benzyl dimethyl amine (0.3 g) were heated under reflux for 20 hours. The excess 1,2-epoxy butane was stripped off in vacuo. The product, a viscous oil, had a residual acid content of 0.09 meq./g; the epoxy content was zero. 2-Hydroxybutyl groups per molecule: 2.

(b) Bis-(2-hydroxyethyl)terephthalate.

Terephthalic acid (166 g; 1.0 mol.), ethylene glycol (500 g; 8 moles) and dibutyl tin oxide (1.5 g) were heated to 190° C. Water and some ethylene glycol were distilled slowly from the mixture until after 3 hours the acid content had decreased to 0.04 meq./g. The product was cooled to about 80° C. and poured into 2 liters of ice-cold water. The water-insoluble part was further purified by recrystallization from hot chloroform. The product crystallized in colourless leaflets having a melting point of 110°–111° C. (Lit. m.p. 111° C.). 2-Hydroxyethyl groups per molecule: 2.

(c) Trifunctional cross-linker from trimethylol propane, succinic anhydride and 1,2-epoxy butane.

Trimethylol propane (13.4 g, 0.1 mol.), succinic anhydride (30 g, 0.3 mol.) and benzyl dimethylamine (0.1 g) were heated with stirring to 100° C. An exothermic reaction set in, the temperature was allowed to rise to 150° C., and the mixture was further heated at 140° C. for 30 minutes; this intermediate half-ester was a viscous mass having an acid content of 7 meq./g. After cooling to 70° C., 1,2-epoxybutane (86 g, 1.2 mol.) and benzyl dimethylamine (0.2 g) were added. The mixture was kept under reflux for 24 hours and excess 1,2-epoxybutane was stripped off in vacuo. The product was a viscous mass; acid and epoxy contents were zero. 2-Hydroxybutyl groups per molecule: 3.

(d) Tetrafunctional cross-linking polyester from trimellitic anhydride, propylene glycol, 1,2-epoxybutane and glycidyl ester C10E.

Trimellitic anhydride (38.4 g, 0.2 mol.), 1,2-propylene glycol (15.2 g, 0.2 mol.), benzyl dimethyl amine (0.3 g) and methyl isobutyl ketone (13.1 g) were stirred under reflux at about 120° C. for 30 minutes. The intermediate was cooled to 100° C. and a mixture of 1,2-epoxybutane (14.4 g; 0.2 mol.) and glycidyl ester C10E (25.0 g, 0.1 epoxy equivalent) was added dropwise over a period of 10 minutes. The temperature was then raised to 140° C. and kept there for 3 hours. Then more glycidyl ester C10E (40 g, 0.16 epoxy equivalents) was added and heating was continued for 5 hours at 140° C. The viscous product had a residual acid content of 0.044 meq./g, an epoxy content of practically nil and a solids content of 91%. 2-Hydroxyl ester groups per molecule:4.

(e) Trifunctional cross-linking polyester from trimellitic acid and glycidyl ester C10E.

Trimellitic acid (210 g, 1 mol.), glycidyl ester C10E (250 g, 1 epoxy equivalent) and benzyl dimethyl amine (2.4 g) are heated to 100° C.; an exothermal reaction set in, and the temperature was kept below 155° C. by slight cooling. After 15 minutes more glycidyl ester C10E (500 g, 2 epoxy equivalents) was added and the temperature was held between 145° and 150° C. for 4 hours. The acid content was then 0.07 meq./g. A bit more glycidyl ester C10E (8.4 g; 0.036 epoxy equivalents) was added and the reaction continued for 2 hours at 145° C. The acid value was then zero and the residual epoxy content 0.05 meq./g.

For comparative purposes the following alkyl esters were used:

(g) Diethyl terephthalate. Commercial sample, m.p. 38°–39° C.

(h) Dibutyl ester of azelaic acid. Commercial sample, liquid.

(i) Tri-n-butyl trimellitate.

Prepared by esterification of trimellitic anhydride with excess n-butanol (catalyst: p-toluene sulphonic acid). The crude product was dissolved in pentane, the solution washed successively with 5%w aqueous KOH and water, and dried with magnesium sulphate; the pentane was evaporated in vacuo. The product was free from hydroxyl and carboxyl groups.

EXAMPLE XIII

The hydroxyl-containing resin of Example XI (b) (100 g) was dissolved in a solvent blend (100 g) containing equal volumes of methyl isobutyl ketone, xylene and n-butanol as well as a fluorocarbon surfactant, FC-430 (0.4% on solvents). Clear lacquers were prepared by blending 10-g-portions of the resulting resin solution with different cross-linking polyesters and catalysts as specified in Table II. The lacquers were then applied onto Zn-phosphated steel panels (0.7 mm thick) to obtain a dry film thickness of 30–35 μm. All coatings were stoved as specified in Table II and the degree of cross-linking achieved was evaluated for:

— condition of hot coating (Hot) directly after stoving (liquid=l, or gelled=g).
— MEK rubs, and
— impact resistance.

Conclusions from these data for the degree of cross-linking are:

++very good
+good
±moderate
—poor
=no cross-linking.

From Table II it can be concluded that the use of cross-linking polyesters containing two or more 2-hydroxyl ester groups per molecule results in well-cross-linked coatings when stoved in the presence of different metal salt catalysts at 180° C. for 30 minutes. Some coatings (Nos. 3, 4, 6, 7, 11 and 13) were even well-cured at 140°–150° C. Comparable polyesters without 2-hydroxyl ester functions (Nos. 17–19) failed to cross-link this polyhydroxylic resin.

TABLE II

| | Coatings as described in Example XIII | | | | | | | |
|---|---|---|---|---|---|---|---|---|
| | Cross-linker | | | | Stoving | | | |
| Experiment No. | of Example | Amount (g) | Catalyst Type | % w | 30 min. at °C. | Hot | MEK rubs | IS cm.kg | Crosslinking |
| 1 | XII (a) | 3.7 | Pb | 0.68 | 180 | g | >50 | >90 | ++ |
| 2 | XII (b) | 1.36 | Pb | 0.67 | 180 | g | >50 | >90 | ++ |
| 3 | XII (b) | 1.36 | Pb | 0.67 | 150 | g | >50 | 10–20 | + |
| 4 | XII (b) | 1.36 | Pb | 0.67 | 140 | g | ~50 | <10 | ± |
| 5 | XII (c) | 3.4 | Pb | 0.67 | 180 | g | >50 | >90 | ++ |
| 6 | XII (c) | 3.4 | Pb | 0.67 | 150 | g | >50 | >90 | ++ |
| 7 | XII (c) | 3.4 | Pb | 0.67 | 140 | g | >50 | 22 | + |
| 8 | XII (c) | 3.4 | Zn | 0.67 | 180 | g | >50 | >90 | ++ |
| 9 | XII (c) | 3.4 | Zn | 0.67 | 150 | g | 25 | <10 | — |
| 10 | XII (c) | 3.4 | Fe | 0.67 | 180 | g | >50 | >90 | ++ |
| 11 | XII (c) | 3.4 | Fe | 0.67 | 150 | g | >50 | >90 | ++ |
| 12 | XII (c) | 3.4 | Ba | 0.67 | 180 | g | >50 | >90 | ++ |
| 13 | XII (c) | 3.4 | Ba | 0.67 | 150 | g | >50 | >90 | ++ |
| 14 | XII (c) | 3.4 | None | | 180 | l | <5 | <5 | = |
| 15 | XII (d) | 3.4 | Pb | 0.69 | 180 | g | >50 | >90 | ++ |

TABLE II-continued

| | Coatings as described in Example XIII | | | | | | | |
|---|---|---|---|---|---|---|---|---|
| | Cross-linker | | | Stoving | | | | |
| Experiment No. | of Example | Amount (g) | Catalyst Type | % w | 30 min. at °C. | Hot | MEK rubs | IS cm.kg | Crosslinking |
| 16 | II (f) | 3.7 | Pb | 0.68 | 180 | g | >50 | >90 | ++ |
| | Comparative experiments | | | | | | | | |
| 17 | XII (g) | 1.16 | Pb | 0.69 | 180 | l | <10 | <5 | = |
| 18 | XII (g) | 1.16 | Pb | 0.69 | 150 | l | <10 | <5 | = |
| 19 | XII (h) | 3.7 | Pb | 0.69 | 180 | l | <10 | <5 | = |

EXAMPLE XIV

A clear lacquer was prepared from the diluted hydroxyl-containing resin of Example XI (a) (10 g; 5 g solids), polyester of Example XII (c) (3.4 g), with Pb octoate (Pb on solids 0.67%w). The lacquer was applied as a 30–35 μm thick coating on steel panels and stoved at 180° C. during 30 minutes. MEK rubs >50, impact strength >90 cm.kg. Conclusion: cross-linking very good.

When the polyester of Example XII (c) was replaced by diethyl terephthalated there was no cross-linking at all after the same cure schedule (hot coating liquid, MEK rubs <5, impact strength <5).

EXAMPLE XV

A clear lacquer was prepared from the hydroxyl-containing resin of Example XI (e) (6.0 g solids, diluted with 4.0 g of the solvent mixture described in Example XIII), polyester of Example XII (c) (6.8 g) and Pb octoate (Pb on solids 0.67%w). 30–35 μm thick coatings were applied on steel panels and stoved at 180° C. during 30 minutes, MEK rubs >50, impact strength 67 cm.kg. Conclusion: cross-linking very good.

When the polyester was replaced by diethyl terephthalate (2.3 g) or dibutyl ester of azelaic acid (3.5 g) there was no cross-linking at all after the same stoving schedule (hot coating liquid, MEK rubs <5, impact strength <5).

EXAMPLE XVI

The hydroxyl-containing resin of Example XI (f) (70 g) was dissolved in the solvent mixture of Example XIII (30 g). Clear lacquers were prepared by mixing 10 g portions of this solution with Pb octoate (0.65%w Pb on composition solids) and with the polyesters of Example XII (a) (4.05 g), XII (b) (3.10 g) and XII (c) (5.10 g), respectively. 30–35 μm thick coatings were applied on steel panels and stoved at 180° C. during 30 minutes. The hot coatings were gelled, MEK rubs were >50, and the impact strength was >90 cm.kg. The conclusion is: very good cross-linking in each of the three cases.

When the above 2-hydroxyl ester polyesters were replaced by diethyl terephthalate (2.7 g) there was no cross-linking at all after the same cure schedule.

EXAMPLE XVII

The hydroxyl-containing resin of Example I (b) was diluted with the solvent blend of Example XIII in a weight ratio 70/40. 11 g of this solution were combined with cross-linking polyesters as indicated in Table III and with Pb octoate (0.67%w Pb on solids); the lacquers were applied on steel panels to give a 30–35 μm thick coating, and stoved for 30 minutes at temperatures as indicated in Table III, where also the results and conclusions are given.

TABLE III

| | Coatings as described in Example XVII | | | | | | |
|---|---|---|---|---|---|---|---|
| | Cross-linker | | Stoving | | | | |
| Experiment No. | of Example | Amount (g) | 30 min. at °C. | hot | MEK rubs | IS cm.kg | Crosslinking |
| 1 | XII (a) | 1.80 | 180 | g | >50 | >90 | ++ |
| 2 | XII (b) | 0.92 | 180 | g | >50 | >90 | ++ |
| 3 | XII (b) | 0.92 | 150 | g | ~50 | <10 | ± |
| 4 | XII (d) | 2.16 | 180 | g | >50 | >90 | ++ |
| 5 | V (a) | 2.75 | 180 | g | >50 | >90 | ++ |
| 6 | II (f) | 2.70 | 180 | g | >50 | >90 | ++ |
| 7 | II (f) | 2.70 | 160 | g | >50 | >90 | ++ |
| 8 | II (f) | 2.70 | 140 | g | ~50 | <10 | ± |
| 9 | XII (e) | 3.50 | 180 | g | >50 | >90 | ++ |
| | Comparative experiments | | | | | | |
| 10 | XII (k) | 2.10 | 180 | l | <10 | <5 | = |
| 11 | XII (i) | 1.42 | 180 | l | <10 | <5 | = |

EXAMPLE XVIII

Resin of Example XI (c) (10 g, solids content 6.94 g) was mixed with polyester of Example XII (c) (5.9 g) and Pb octoate (Pb: 0.66%w on solids) and solvent (1.5 g). The clear lacquer was applied on steel panels (coating 30–35 μm thick) and stoved at 180° C. during 30 minutes. The hot coating was gelled; MEK rubs >50, impact strength >90 cm.kg, and the conclusion is: good cross-linking.

In the same manner a lacquer was prepared from the resin of Example XI (d) (9 g), the polyester of Example XII (b) (5.2 g), Pb octoate (0.67%w Pb on solids) and solvent (3.0 g), and evaluated as described above. The conclusion from hot coating (gelled), MEK rubs (>50), and impact strength (>90 cm.kg) was: very good cross-linking.

EXAMPLE XIX

Clear lacquer was prepared from the resin of Example XI (g) (10 g, 4.0 g solids), the polyesters of Example XII (a) and XII (b) (1.0 g), Zn octoate (1.0%w Zn on solids) and solvent (1.0 g). When applied on steel panels (coatings 30–35 μm) and stoved at schedules of 180° C./30 minutes or 200° C./10 minutes both formulations showed a very good cross-linking (hot coating gelled; MEK rubs >50; impact strength >90 cm.kg).

The resin of Example XI (g) is a well-known material for internal can lining because of its inherent flexibility, and a cure schedule 200° C./10 minutes is typical for can lacquers. This Example demonstrates the suitability of the present compositions for can lacquers.

When the polyester was replaced by diethyl terephthalate (1.0 g) there was no cure at all, not even at 200° C./15 minutes.

EXAMPLE XX

A white coating powder.

The resin of Example I(b) (1000 g) was coarsely ground to a particle size of about 2 mm, dry blended with the cross-linking polyester of Example II (b) (270 g), titanium dioxide (635 g), Pb octoate (25 g), and a commercial acrylate-type flow control agent (6.3 g). This blend was homogenized by extrusion in an extruder at the following conditions:

barrel temperature: 110° C.
screw temperature: 50° C.
extrudate temperature: 115°–120° C.
screw speed: 40 rpm The extrudate was cooled to room temperature, ground, and sieved to a particle size of less than 75 μm. The powder was applied by electrostatic spraying to degreased cold-rolled steel panels (dry film thickness 55–60 μm). The panels were stoved at 180° C. or at 160° C. for 30 minutes. At both temperatures wellflowed glossy coatings were obtained with the following properties:

| Hardness (Konig) | 210–215 seconds |
| Adhesion (Gitterschnitt) | Gt 0 |
| Impact strength | >90 cm.kg |
| Xylene immersion (15 min./22° C.) | unaffected |

EXAMPLE XXI

Composition containing a precondensate of components (I) (1) and (I) (2).

A mixture of Polyether D (566 g, 1,2-epoxy equivalents), diisopropanolamine (79.8 g, 0.6 mol.) and isopropanol amine (22.5 g, 0.3 mol.) was melted and reacted at 140° C. for 3 hours; the epoxy content was then zero and the hydroxyl content 0.67 eq./100 g. A blend of trimellitic anhydride (57.6 g, 0.3 mol.), acetone (100 g) and glycidyl ester C10E (187.5 g, 0.75 epoxy equivalents) was added gradually in about ½ hour while maintaining the reaction temperature at 130°–140° C. and distilling off the acetone. The mass was then kept at 135° C. for 2 more hours and cooled to room temperature. The resulting precondensate (a brittle solid) had a residual acid content of 0.02 meq./g.

A portion of this precondensate (10 g) was dissolved in the solvent blend of Example XIII (10 g). Pb octoate (0.2 g) was added and the clear lacquer was applied onto phosphatized steel panels. After stoving at 180° C. for 30 minutes a 35 μm thick glossy hard coating was obtained which was resistant to methyl ethyl ketone and had an Impact Strength of 90 cm.kg.

EXAMPLE XXII

Self-cross-linking acrylic-type resin containing 2-hydroxyl ester groups.

Preparation of resin by mass copolymerization.

A 1-liter round bottom flask equipped with stirrer and reflux condenser was charged with the vinyl ester of branched monocarboxylic acids (250 g), and heated to 170° C. A mixture of the following ingredients was pumped into this reactor at a uniform rate over a period of four hours:

| styrene | (250 g) |
| n-butyl methacrylate | (190 g) |
| 2-hydroxy ethyl acrylate | (310 g) |
| Di-t-butyl peroxide | (20 g) |

The temperature was kept at 165°–170° C. throughout the addition period. Thereafter, the clear, viscous mass was stirred for another hour at 170° C. and then discharged. The clear brittle copolymer had molecular weight 5080 ($\overline{M}n$, GPC method), and contained 0.4%w of residual styrene and <0.3%w of residual vinyl ester. Its hydroxyl content was 0.23 eq./100 g.

Cross-linking of the resin.

The above resin (10 g) and Pb octoate (0.2 g) were dissolved in the solvent blend of Example XIII (15 g). The clear lacquer was applied onto a phosphatized steel panel. After stoving at 180° C. for 30 minutes a 30 μm thick glossy hard coating was obtained which was resistant to methyl ethyl ketone (>50 MEK rubs) and had an impact strength of 11 cm.kg.

When the Pb octoate was omitted the coating after stoving had very poor solvent resistance (dissolved when rubbed with a MEK-wetted cloth).

EXAMPLE XXIII

Cure of an epoxy resin.

(1) Component I (1): Polyether G in a 30%w solution in a mixture of methyl isobutyl ketone/butanol (1:1 weight ratio).

(2) The cross-linking polyester, a soluble, low-mol wt polypropylene glycol terephthalate, was prepared as follows:

A mixture of terephthalic acid (166 g, 1 mol.), propylene glycol (608 g, 8 mol.) and dibutyl tin oxide (2 g) was heated at 190° C. while a mixture of water and propylene glycol was distilled off (distillate about 300 g) until the acid content was <0.03 meq./g. That took 2½ hours. The residue contained polyester and propylene glycol in a 1:1 weight ratio. This residue was used for the coating experiments; the propylene glycol is then solvent component.

Components (1) and (2) were mixed in a 4:1 solid matter weight ratio, and Zn octoate (0.65%w Zn on total solids) was added. The solution was tested as a can lacquer. A 4–6 μm thick film was applied to tin plate panels with a wire rod applicator and stoved at 200° C. during 10 minutes. The clear colourless coating had an excellent flexibility (test: coated panel folded, and dipped in aqueous CuSO$_4$/HCl solution: on the bend no dark discoloration). MEK rubs: >50. Standard sterilization test in distilled water (in autoclave at 120° C., 90 minutes): film not affected.

We claim as our invention:

1. A thermosetting binder composition, heatcurable to give an insoluble infusible coating, comprising:
   (I) a mixture of:
      (1) a non-acidic polyester prepared by esterifying a polyglycidyl polyether of 2,2-bis(4-hydroxyphenyl) propane with a hydroxy alkane monocarboxylic acid said polyester being essentially free of ethylenic unsaturation, having a molecular weight of at least 900 and a hydroxyl content of at least 0.2 equivalent per 100 g, and
      (2) a non-acidic polyester having an acid number of not more than 10 of a polycarboxylic acid crosslinking agent having more than one β-hydroxyl ester group per molecule, at least one of components (1) and (2) having a hydroxyl functionality of more than 2, and
   (II) a transesterification-promoting metal salt or metal complex curing catalyst which is soluble in liquid hydrocarbons.

2. The binder composition of claim 1 wherein component (I) (1) has a hydroxyl content of not more than 0.8 equivalent per 100 g.

3. The binder composition of claim 1 wherein component (I) (2) is a non-acidic polyester prepared by reacting a polycarboxylic acid anhydride with one or more glycols, glycol monoethers or polyols.

4. The binder composition of claim 3 wherein component (I) (2) is derived from trimellitic anhydride.

5. The binder composition of claim 3 or 4, wherein the non-acidic polyester is further reacted with a glycidyl ester of saturated aliphatic monocarboxylic acids wherein the carboxyl group is attached to a tertiary or quaternary carbon atom, which monocarboxylic acids contain 9 to 11 carbon atoms per molecule.

6. The binder composition of claim 1 wherein component (II) is a polyvalent metal salt or complex which is insoluble in water.

7. The binder of claim 1 wherein the acid is selected from the group consisting of glycolic acid, lactic acid and dimethylol propionic acid.

* * * * *